United States Patent [19]

Schiavone

[11] 4,218,624

[45] Aug. 19, 1980

[54] ELECTRICAL VEHICLE AND METHOD

[76] Inventor: Edward L. Schiavone, 10502 Insley St., Silver Spring, Md. 20902

[21] Appl. No.: 801,722

[22] Filed: May 31, 1977

[51] Int. Cl.$^2$ .............................................. B60L 11/22
[52] U.S. Cl. .................................... 290/45; 180/65 D; 320/61; 322/4
[58] Field of Search ...................... 290/1 R, 42, 43, 53, 290/54, 45; 320/61; 180/65 R, 65 A, 65 D; 115/4; 185/30, 29; 322/4, 3, 100, 40; 310/15, 30, 25

[56] References Cited

U.S. PATENT DOCUMENTS

| | | | |
|---|---|---|---|
| 2,286,897 | 6/1942 | Costa et al. | 310/25 |
| 3,105,153 | 9/1963 | James, Jr. | 322/3 X |
| 3,507,580 | 4/1970 | Howard et al. | 320/61 UX |
| 3,541,409 | 11/1970 | Storsand | 318/150 |
| 3,559,027 | 1/1971 | Arsem | 320/61 |
| 3,861,487 | 1/1975 | Gill | 320/61 X |
| 3,939,935 | 2/1976 | Gill | 320/61 X |
| 4,032,829 | 6/1977 | Schenavar | 322/4 X |
| 4,113,047 | 9/1978 | Turner | 180/65 D |

*Primary Examiner*—J. V. Truhe
*Assistant Examiner*—Morris Ginsburg

[57] ABSTRACT

The invention is an electrical power vehicle employing one or more motion electrical generators for converting up and down, horizontal or component motion of the vehicle or its wheel structure relative to the vehicle to pulse-type power for operating a flywheel motor-generator unit which drives a flywheel via a torque damper whereby the flywheel generator provides charging power for the batteries, which in turn operate the vehicle through a motor speed control, and supplies the other vehicle circuits.

A self-contained electric generator may operate at any location in the vehicle, preferably at the location of greatest vibration created by reciprocating motion when the vehicle is operated over roadways.

2 Claims, 2 Drawing Figures

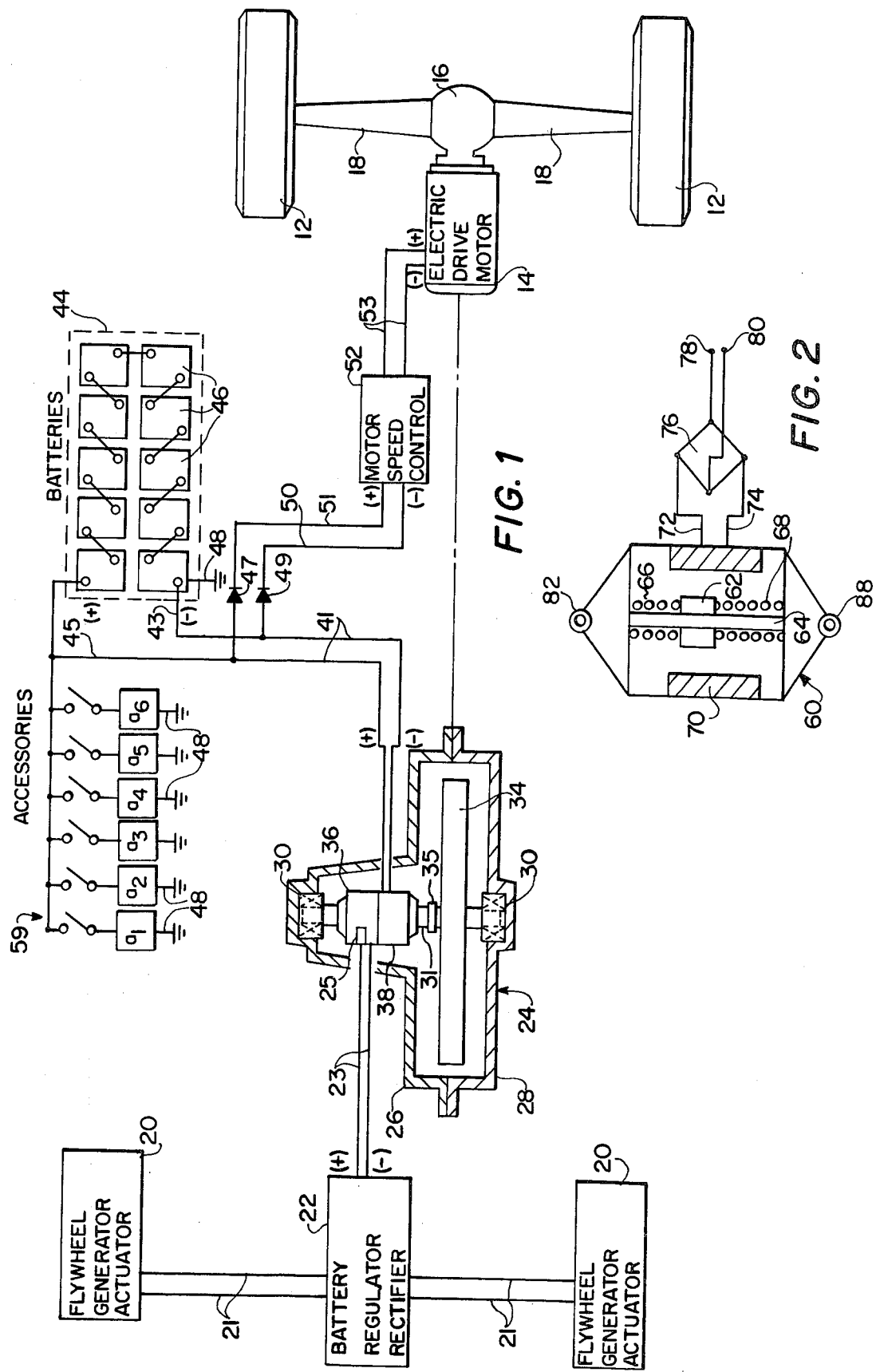

ELECTRICAL VEHICLE AND METHOD

BACKGROUND OF THE INVENTION AND PRIOR ART

Vehicles powered by external electrical sources, employing a flywheel to store mechanical energy, have been known for years. Usually, the energy storage unit comprises an electric motor arranged together with a flywheel, in a gas tight housing, holding a vacuum or inert gas of the variety lighter than air, ie, helium or hydrogen, under very low pressure. Frequency converters feed energy from the external AC distribution network to accelerate the flywheel through a flywheel motor. During movement of the vehicle, the electric machine operates as a generator, driven by the mechanical energy stored by the flywheel, which energy is converted into electric energy for drive. Such an arrangement is shown in U.S. Pat. No. 3,541,409.

U.S. Pat. No. 3,559,027 discloses an arrangement wherein shock absorber generators convert mechanical energy into electrical energy for battery charging.

U.S. Pat. No. 1,557,570 discloses a concept in which the reciprocating motion of a vehicle utilizes a mechanical coupling between the wheel supports and the frame to power a generator to charge the vehicle battery. However, this patent does not provide means to provide large surges of intermittent charging current to the batteries, nor does it provide a generator similar to the type of the present invention. Also, the patent does not disclose any flywheel or flywheel motor-generator unit.

SUMMARY OF THE INVENTION

The present invention, in its preferred embodiment, is a much less complicated and greatly more efficient arrangement for converting up and down (or other) motion of vehicle wheels (relative to its body) to electrical energy, driving a small flywheel motor-generator unit, which in turn supplies electrical charging current to the vehicle battery system for driving a large electric drive motor, to power the vehicle, optionally through an automatic transmission, via a differential for the rear vehicular wheels.

In an alternative form of the invention, the motion generator may be placed in a location relative to the vehicle at the point of greatest vibration created by reciprocating motion (vertical or horizontal or a component thereof) while the vehicle is operated over conventional roadways. This motion generator furnishes the power to drive a flywheel that is coupled to a flywheel generator, the primary purpose of which is to provide charging current for maintaining a high energy level in the storage batteries. The main function of these batteries is to furnish continuous power in an electric vehicle for all purposes.

The principal reason for the present invention is to avoid the frequent requirement for charging batteries, thereby extending the driving range. Another important object of the present invention is the avoidance of complex multi-phase AC electro-mechanical circuits and apparatus of prior art systems, through the use of a DC or quasi-DC system. This adds reliability and cost savings to the improved range for the vehicle, be it bicycle, motorcycle, automobile or the like.

For example, it is known that a charging rate of high amperage in surges or waves, considerably shortens the recharging time for the batteries. Thus, batteries may be fully charged from such sources for the reason that the plates are entirely cleaned of sulphate, exposing the entire area to action of the charge.

It has also been previously discovered that a continuous charge to a battery at a low rate (such as a trickle charge) frequently damages the battery and is often not adequately effective to maintain the battery at the desired level of charge. These disadvantages can be overcome by using pulse-type charging.

In the present invention, the otherwise lost energy, occasioned by the vehicle wheel movement relative to the body, or body movement is converted to useful energy by employing one or more reciprocating generators. Obviously, an automobile may have, e.g., four such generators, each of which contributes to battery charging while the vehicle is in motion and the flywheel motor-generator unit maintains charging at stop lights and for long periods of extended idle or non-use.

A torque damper is included in the drive shaft between the electric motor-generator unit and the flywheel, which is preferably of heavy duty resilient material but may alternatively comprise a fluid-coupling. Due to the large moment of inertia of the flywheel, small fluctuations of the torque do not appreciably affect the uniformity of the flywheel motion. Additionally, a voltage regulator may be included between the flywheel generator (or alternator section) and the batteries being charged, but is usually not necessary because of the pre-determined maximum output of the motor-generator unit.

A feature of the invention resides in the provision of a voltage regulator/rectifier between the shock absorber or motion translator generators and the electric motor driving the flywheel. While the electric pulses generated by the shock absorber generators are random in nature, they are clipped by the regulator to the same amplitude (approximately the average magnitude of the voltage pulses developed).

The rectifier section comprises a conventional filter-type with a time constant determined for an average of 5-10 pulses per second rather than the more common 60 cycle type, such that the flywheel motor-generator unit is driven as constantly as possible with the coupling between the flywheel motor-generator unit and flywheel assisting in applying energy as constantly as possible to the flywheel, its moment of inertia serving to drive the generator or alternator at a relatively constant speed to develop the charging voltage, while nevertheless taking advantage of the inevitable pulse-type power being generated by the erratic bouncing or swaying of the vehicle.

The invention will be better understood from a reading of the following detailed description thereof when taken in light of the accompanying drawings wherein:

FIG. 1 is a schematic illustration of the electromechanical components and circuitry of the present invention; and, FIG. 2 is a view of a self-contained electric generator operable through motion translation.

The vehicle, represented in the drawings, includes the rear wheels 12, of an automobile, driven by electric drive motor 14, through a conventional differential 16, in turn driving the wheels 12, through axles 18. The electric drive motor 14, optionally includes a conventional automatic transmission for conserving power.

Flywheel generator actuators 20, are one of the sources of electrical energy derived from relative motion between the vehicle body and wheels. U.S. Pat.

No. 3,559,027, infra, discloses an electric shock absorber generator capable of converting mechanical energy to electricity for charging a battery.

In one embodiment of the present invention, the up and down motion of the wheels relative to the vehicle body, drives the flywheel through such a motion translating generation. However, a large number of reciprocating generators are available for use as actuators 20. Preferably, I employ the generator of FIG. 2, later to be described in detail.

In FIG. 1, electrical leads 21, transfer the electrical energy from one or more flywheel generator actuators 20, to flywheel battery regulator/rectifier 22, which in turn passes the clipped voltage pulses, now somewhat smoothed out into semicontinuous or pulsating DC voltage (depending on the roadbed, springs and shocks), over electrical leads 23, to the motorsection 36, of the motor-generator or motor-alternator unit, with the alternator-section being shown at 38. Optionally, a conventional centrifugal switch 25, may be included in one of the leads 23, to cut out the flywheel actuator input power when the flywheel reaches a pre-determined speed.

A housing 24, is provided for flywheel 34, which includes an upper casing 26, and a lower casing 28, with bearings 30, for the axis shaft 31, of flywheel 34, this shaft being the drive shaft between generator or alternator 38, and flywheel 34. Torque damper 35, is shown as a heavy duty resilient coupling in the drive shaft 31, between alternator 38, and flywheel 34.

The electrical output from generator 38, is applied over leads 41, and thence via leads 43 and 45, to a plurality of batteries 46, included in battery case 44, with negative lead 43, shown grounded at 48, which is the vehicle common ground.

The electrical energy supply for powering the vehicle is derived over leads 50 and 51, from leads 41, and applied through motor speed control 52, (which may comprise a heavy duty potentiometer) and thence via leads 53, to main electrical drive 14. Leads 50 and 51, optionally include diodes 47 and 49.

The accessory controls, generally indicated at 59, operate the various loads $a_1$ through $a_6$, being connected to common ground 48, and connected to the positive battery lead 45, through their respective switches (shown open), all in conventional manner.

While it is appreciated that the subject invention does not totally eliminate the necessity for charging the batteries 46; nevertheless it cuts the frequency of such charges and substantially extends the useful range of the vehicle beyond the 50 mile plus limit currently encountered.

Various modifications may be made to the device of FIG. 1. For example, conventional dynamic braking may be employed to stop the flywheel only in the event of accident. Deacceleration switches and flip-over switches are well known and the combination may be employed to actuate a braking mechanism which would absorb the kinetic energy of flywheel 34.

Obviously, each flywheel generator actuator 20, may include its own regulator/rectifier unit in the form of a solid state power unit, now commercially available.

In FIG. 2, a modified form of flywheel generator actuator is shown at 60. It is of the preferred type which may be placed in any locale within the vehicle or may be substituted for the actuators 20, between the wheels and frame of the vehicle. One or more of these units 60, may be connected in parallel with one or more of the actuators 20, to increase the power derived from the otherwise lost motion established in the vehicle by the roadbed.

A weighted armature 62, is slidably mounted on shaft 64, between balancing springs 66 and 68. Weighted armature 62, thus constitutes a freely movable mass adapted to move within stator 70, to constitute a moving magnetic field producing lines of flux for inter-linking coils of stator 70, to generate an output voltage between leads 72 and 74, which pulsating voltage is rectified by bridge 76, to appear as a uni-directional pulsating output between terminals 78 and 80.

The structure includes a pivot point connection 82, for suspending the generator at a position to operate at the highest efficiency tending to assume an angle of greatest thrust aided by gravity. Of course, multiple units 60, may be suspended at lesser efficient locations for adding to the power generated.

In operation when the generator 60, is placed in a moving vehicle, the armature 62 oscillates, thereby producing useful power output.

The generator 60, may be elongated and physically disposed in parallel with the actuator 20, and electrically connected in parallel therewith or it may be disposed at other angles for generation of electricity through motion established as a component between the vertical and horizontal, for example, even horizontal swaying motion may be used to actuate this generator. For this purpose eyelet 88 is provided, but it should be realized that if the device 60, is freely pivotally mounted, as only at 82, it will also pick up component motion as it sways.

Roads, in general, are of many varities, including corrugated, curving mountain roads, paved, unpaved, hilly and cobblestone. Various types of motion are available from these varieties of roadbeds.

This generator may also derive its motion from boats, sea waves, rapids and other sources to produce power.

What is claimed is:

1. In a vehicle utilizing storage batteries as a source of electrical energy to supply power to the vehicle drive means the combination comprising
   (a) transducer means for translating transverse vehicular motion into electrical energy;
   (b) motor-generator means having a common drive shaft;
   (c) flywheel means mounted on said common drive shaft to rotate with said drive shaft;
   (d) means electrically connecting said transducer means and the motor of said motor-generator means to supply the electrical energy output of said transducer means for operating said motor; and
   (e) means electrically connecting the output of the generator of said motor-generator means to the storage batteries of said vehicle for charging said storage batteries;

whereby the relative transverse motion between the vehicle and the surface over which the vehicle travels is converted into electrical energy for driving the motor-generator means which supplies charging current for the storage batteries of the vehicle, the flywheel on the common drive shaft of the motor-generator means being utilized to supply mechanical driving force for the motor-generator means in the absence of electrical energy from said transducer means.

2. The method of utilizing transverse vehicular motion produced by road surface irregularities to charge the batteries of a battery-powered vehicle comprising the steps of
(a) translating the transverse vehicular motion into electrical energy;
(b) applying the electrical energy to drive a motor-generator-flywheel unit mounted on the vehicle, said flywheel providing additional driving force and energy storage means for operating the generator of said motor-generator-flywheel unit;
(c) utilizing the moment of inertia of said flywheel to provide force for driving said generator during periods when transverse vehicular motion is not available to produce electrical energy; and
(d) charging the batteries of said battery-powered vehicle with the output of said generator.

* * * * *